(12) United States Patent
Lugnet et al.

(10) Patent No.: US 7,594,811 B2
(45) Date of Patent: Sep. 29, 2009

(54) METHOD PERTAINING TO COMBUSTION, AND A BURNER

(75) Inventors: Anders Lugnet, Rimbo (SE); Tomas Ekman, Saltsjö-Boo (SE)

(73) Assignee: AGA AB, Lidingo (SE)

( * ) Notice: Subject to any disclaimer, the term of this patent is extended or adjusted under 35 U.S.C. 154(b) by 88 days.

(21) Appl. No.: 10/563,391

(22) PCT Filed: Aug. 9, 2005

(86) PCT No.: PCT/SE2005/001194

§ 371 (c)(1),
(2), (4) Date: Apr. 4, 2007

(87) PCT Pub. No.: WO2006/031163

PCT Pub. Date: Mar. 23, 2006

(65) Prior Publication Data

US 2007/0172780 A1    Jul. 26, 2007

(30) Foreign Application Priority Data

Sep. 15, 2004   (SE) .................................. 0402223

(51) Int. Cl.
*F23N 1/02*    (2006.01)
(52) U.S. Cl. ................. 431/12; 431/8; 431/10
(58) Field of Classification Search ........... 431/8, 431/10, 12
See application file for complete search history.

(56) References Cited

U.S. PATENT DOCUMENTS

| | | | | |
|---|---|---|---|---|
| 4,378,205 A | * | 3/1983 | Anderson | 431/5 |
| 4,511,325 A | * | 4/1985 | Voorheis | 431/10 |
| 4,541,796 A | * | 9/1985 | Anderson | 431/187 |
| 4,945,841 A | * | 8/1990 | Nakamachi et al. | 110/341 |
| 4,988,285 A | * | 1/1991 | Delano | 431/5 |
| 5,302,112 A | * | 4/1994 | Nabors et al. | 431/8 |
| 5,431,559 A | * | 7/1995 | Taylor | 431/164 |
| 5,458,483 A | * | 10/1995 | Taylor | 431/350 |
| 5,587,283 A | * | 12/1996 | Karinthi et al. | 431/10 |
| 5,611,682 A | * | 3/1997 | Slavejkov et al. | 431/8 |
| 5,833,447 A | * | 11/1998 | Bodelin et al. | 431/10 |
| 5,975,886 A | * | 11/1999 | Philippe | 431/165 |
| 5,984,667 A | * | 11/1999 | Philippe et al. | 431/175 |

(Continued)

FOREIGN PATENT DOCUMENTS

EP    0 343 746 A2    11/1989

(Continued)

*Primary Examiner*—Kenneth B Rinehart
*Assistant Examiner*—Jorge Pereiro
(74) *Attorney, Agent, or Firm*—Alfred J. Mangels

(57) ABSTRACT

A method and apparatus relating to the combustion of a fuel with an oxidant in a heating furnace, wherein the fuel and the oxidant are delivered to a burner head. In a first method step fuel and oxidant are emitted from the burner head in close proximity to each other, so that combustion essentially takes place close to and at a small distance outward of the burner head, and until a temperature is reached in the furnace space that exceeds the spontaneous combustion temperature of the fuel. In a second method step the fuel and the oxidant are instead emitted from the burner head at a mutual distance apart, so that combustion takes place at a distance from the burner head corresponding to at least the diameter of the burner head and outward of the burner head.

4 Claims, 2 Drawing Sheets

U.S. PATENT DOCUMENTS 6,074,197 A * 6/2000 Philippe ...................... 431/10
6,196,831 B1 * 3/2001 Dugue et al. ................... 431/8
6,331,107 B1 * 12/2001 Philippe ..................... 431/285
6,524,097 B2 * 2/2003 Hoke et al. .................... 431/8
2001/0023053 A1 * 9/2001 Hoke et al. .................... 431/8

FOREIGN PATENT DOCUMENTS

EP          0 790 461 A2    8/1997

* cited by examiner

Fig. 3
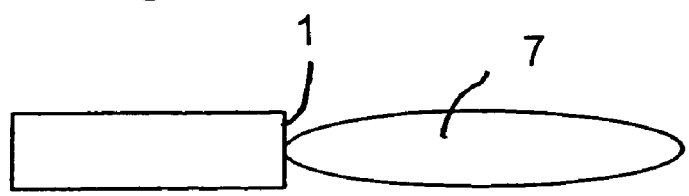
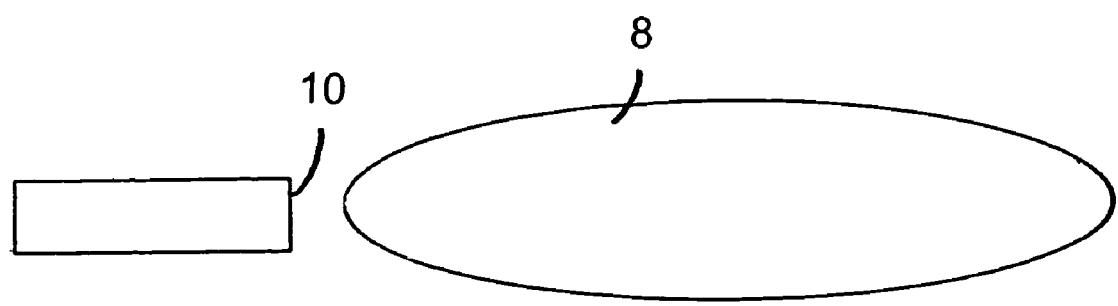
Fig. 4

METHOD PERTAINING TO COMBUSTION, AND A BURNER

BACKGROUND OF THE INVENTION

1. Field of the Invention

The present invention relates to a method pertaining to combustion, and to a burner. More specifically, the invention relates to a method and to a burner for the combustion of oxygen gas in respect of heating furnaces.

2. Description of the Related Art

When combusting hydrocarbons in combination with high oxygen concentrations, flame temperatures in excess of 2000 degrees C. are normally reached, together with furnace atmospheres of very high partial pressures of carbon dioxide and steam. This results in drawbacks, such as high $NO_x$-contents and local overheating problems.

It is highly desirous to design burners that have emission-diminishing properties. The present invention satisfies that desire.

SUMMARY OF THE INVENTION

Accordingly, the present invention relates to a method pertaining to the combustion of a fuel with an oxidant in a heating furnace, wherein the fuel and the oxidant are delivered to a burner head. In a first method step fuel and oxidant are emitted from the burner head in the close proximity of one another, so that the combustion process takes place essentially close to and at a small distance away from the burner head until a temperature is reached in the furnace space that exceeds the spontaneous combustion temperature of the fuel. In a second method step the fuel and the oxidant are instead emitted from the burner head in mutually spaced relationship, so that the combustion process takes place essentially at a distance from the burner head corresponding to at least the diameter of the burner head and away from the burner head.

The invention also relates to a burner head that includes a fuel supply nozzle and a first oxidant outlet opening in close proximity to the fuel nozzle, so that combustion takes place close to and at a small distance away from the burner head. The burner head also includes further oxidant outlet openings that are located at a distance from the fuel nozzle, so that combustion takes place at a distance from the burner head corresponding to at least the diameter of the burner head and outward of the burner. The burner is adapted to deliver the oxidant at an overpressure of at least 2 bar.

BRIEF DESCRIPTION OF THE DRAWINGS

The invention will now be described in more detail, partly with reference to exemplifying embodiments of the invention illustrated in the accompanying drawings, in which:

FIG. 3 is a diagrammatic illustration of a burner head and a flame as seen from one side when the burner is operated in a first manner; and FIG. 4 is a diagrammatic illustration of a burner head and a flame as seen from one side when the burner is operated in a second manner.

DESCRIPTION OF THE PREFERRED EMBODIMENTS

The inventive method thus relates to the combustion of a fuel with an oxidant in a heating furnace, in which the fuel and the oxidant are delivered to a burner head. The burner head is mounted in a known manner in a furnace wall, so that the flame produced in the combustion process will extend into the furnace chamber.

The invention is characterized in that the combustion process takes place in two steps, where the second step affords advantages over the known technology.

In a first method step, fuel and oxidant are emitted from the burner head in close relationship with one another, so that the process of combustion essentially takes place close to and slightly spaced from the burner head. This method is known per se, in which the burner is designated as an "Oxy-fuel" –burner.

In this first step of the method, the burner is operated until a temperature exceeding the spontaneous combustion temperature of the fuel is reached in the furnace chamber.

The second step of the combustion process can conveniently be initiated when the furnace temperature is above roughly 750 degrees C.

According to the invention, this second method step is carried out when that temperature or a still higher temperature has been reached. In this second method step, the fuel and the oxidant are instead emitted from the burner head at a distance from each other, so that combustion takes place generally at a distance from the burner head that corresponds at least to the diameter of the burner head and away from the burner head.

Figure 1:
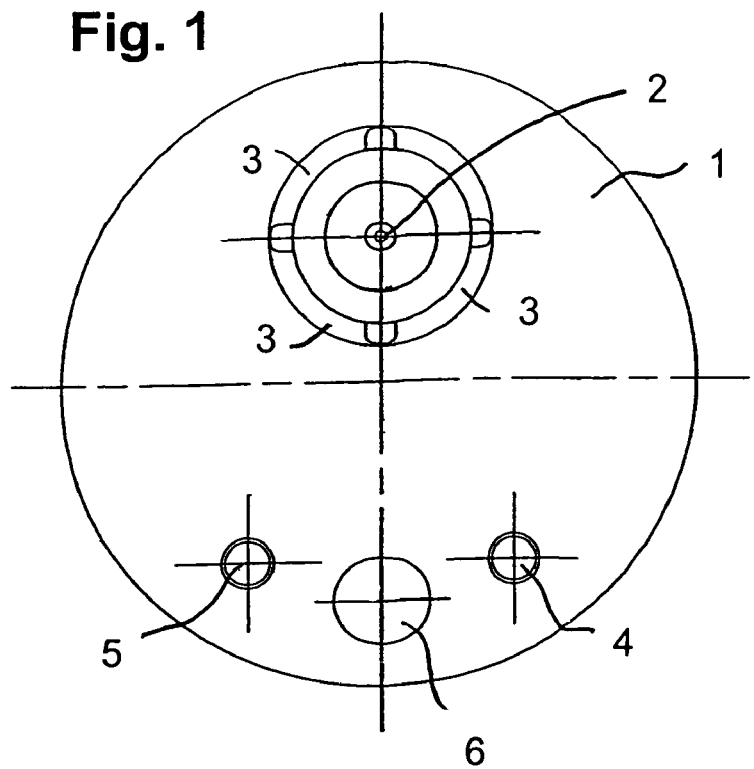
FIG. 1 is a straight-on, front view of a burner head according to a first embodiment.

It is preferred that in the first method step the fuel is emitted from a fuel nozzle 2 in the burner head 1, and the oxidant is emitted from oxidant outlet openings 3 placed concentrically around the fuel nozzle 2, as shown in FIG. 1.

It is also preferred that in the second method step, the fuel is emitted from a fuel nozzle 2 in the burner head 1, and the oxidant is emitted from oxidant outlet openings 4, 5 located on one side of and at a distance from fuel nozzle 2, as shown in FIG. 1.

According to one preferred embodiment of the invention, the oxidant outlet openings 4, 5 are Laval nozzles or venturi-nozzles.

The opening 6 functions to monitor the flame.

According to one preferred embodiment of the invention, the oxidant outlet openings 4, 5 are spaced from the fuel nozzle 2 at a distance that exceeds half the diameter of the burner head.

It has been found that a distance of about 40 mm suffices to provide the desired effect.

The burner thus permits two different modus operandi, partly as a typical oxy-fuel burner and partly as a burner which functions to produce a flame of essentially lower maximum temperature. That lower flame temperature is adapted to be less than the temperature at which the formation of $NO_x$ is limited by the reaction kinetics, that temperature being about 1550 degrees C.

That result is achieved by the above-mentioned placement of the oxidant outlet openings 4, 5 and the fuel nozzle 2, whereby fuel and oxygen are combusted further away from the burner head in comparison with a conventional oxy-fuel-combustion process. That result is illustrated in FIGS. 3 and 4, wherein FIG. 3 illustrates the mutual relationship between the length and the propagation of the flame 7 in respect of oxy-fuel-combustion, and FIG. 4 illustrates the mutual relationship between the length and the propagation of flame 8 in the case of combustion according to the second step of the inventive method.

The concept of the invention resides in lowering the oxygen content in the combustion zone, despite the oxidant having an oxygen content of more than 80%, by virtue of separation, high pressure, and an optimized nozzle placement. That is achieved with a burner head configuration that results in a high subpressure on those surfaces of the burner head 1 that lack medium-emitting nozzles. As a result of that subpressure, flue gases are sucked in from the furnace atmosphere and quickly mix with the outflowing media and therewith create turbulence. The mixing medium, i.e., the furnace atmosphere, typically has an oxygen content of 0.5-10%. The remainder of the gas is $CO_2$ and $H_2O$ and $N_2$ in varying proportions.

Because $CO_2$, $H_2O$, and $N_2$ do not actively take part in the combustion process, those constituents act as "combustion retardants." The dilution of the oxygen and the fuel is very high. Typically, oxygen concentrations of 7-15% are reached in the combustion process, despite the use of pure oxygen. When applying the present invention there is obtained at process temperatures above the spontaneous combustion temperature a diffused but controlled combustion that significantly lowers the formation of $NO_x$ gases, primarily NO and $NO_2$.

As a result, fuel and oxidant are mixed with the furnace flue gases before the fuel and oxidant gases meet one another. That provides a larger and colder flame 8 in spite of the efficacy corresponding to that achieved when combustion is effected according to known technology. The fuel nozzle 2 and oxidant openings 3, 4, and 5 can be conveniently directed straight forward, i.e., they need not be directed away from or towards each other, although they can be angled towards or away from the longitudinal axis of the burner head.

According to one preferred embodiment of the inventive method, the oxidant is gaseous and is at an oxygen concentration of 85% or higher.

According to one significant feature of the inventive method, the oxidant is delivered to the burner at a pressure of at least 2 bar overpressure. Because the flame temperature is lower and the mixture of gas in the furnace volume is greater than in the case of oxy-fuel-combustion, the formation of $NO_x$ is minimized while the temperature differences in the furnace space are dramatically lowered at the same time.

In comparison with conventional combustion devices used in industrial processes, application of the inventive method results in a lowering of $NO_x$ formations by more than 90%, without impairing the efficiency of the process and without the supply of substances other than those required for the combustion.

A burner head according to the present invention is no larger than a known burner head for oxy-fuel-combustion. In a preferred embodiment of the invention, the burner head has a diameter of about 70 mm.

The compact structure enables the invention to be applied in equipment already possessed by the user. Moreover, the equipment can be placed in a small, water-cooled protective casing for application at very high process temperatures.

The above-mentioned advantages are achieved in accordance with the invention with a selected fuel, which can be solid fuel, gaseous fuel, or liquid fuel. The inventive arrangement can replace existing combustion systems in principle without re-constructing the furnace equipment used for the process.

It is beneficial when the fuel used is oil, propane, or natural gas.

The burner head shown in FIG. 1 is intended for oil as the fuel.

Figure 2:
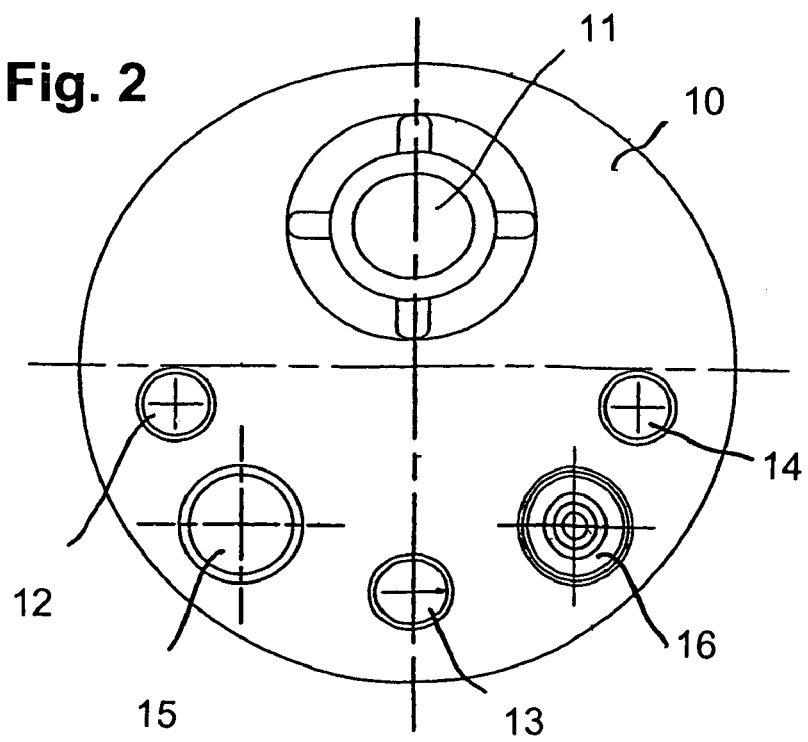
FIG. 2 is a straight-on, front view of a burner head according to a second embodiment.

FIG. 2 shows a burner head 10 for natural gas as fuel. The fuel nozzle 11 is intended for natural gas. The outlet openings 12, 13, 14 are intended for the oxidant. The opening 15 is intended for monitoring the flame and the opening 16 is intended for a pilot flame.

Because the oxidant openings and the fuel nozzles can be directed straight forwards, a burner head is achieved that is inexpensive, that is easy to maintain, and that can be applied in existing processes without requiring measures other than the exchange of the burner head.

The oxidant is injected into the combustion space via one or more oxidant openings in the form of Laval nozzles or venturi nozzles. The oxidant will preferably be at an overpressure of at least 2 bar. The higher the pressure, the better the efficacy of the invention. A preferred pressure for normal applications is 4-5 bar. The fuel is injected via conventional fuel nozzles at the pressure available.

Although the invention. has been described above with reference to a number of exemplifying embodiments it will be understood that the design of the burner head can be varied. For instance, the burner head can include more oxidant outlet openings than those shown. Moreover, the placement of the fuel nozzle can be different from that shown in the drawings.

It will therefore be understood that the present invention is not restricted to the embodiments described above, but can be varied within the scope of the accompanying claims.

What is claimed is:

1. A method for combustion of a fuel with an oxidant in a heating furnace, wherein the fuel and the oxidant are delivered to a burner head, said method comprising: a first step of emitting fuel and oxidant from the burner head in close proximity to each other, so that combustion occurs adjacent to the burner head and for a time until a temperature that exceeds a spontaneous combustion temperature of the fuel is reached within the furnace; and a second step of thereafter emitting the fuel and the oxidant from the burner head at a mutual distance apart, so that combustion occurs at a point spaced from and outwardly of the burner head at a distance of at least a diameter of the burner head, wherein the fuel is emitted from a fuel nozzle in the burner head, and wherein the oxidant is a gaseous oxidant that has an oxygen content of at least about 80% and is delivered at an overpressure of at least 2 bar and is only emitted through oxidant outlet openings located on a side of and spaced from the fuel nozzle at a distance that exceeds half the diameter of the burner head.

2. A method according to claim 1, wherein in the first step the fuel is emitted from a fuel nozzle in the burner head, and the oxidant is emitted concentrically around said fuel nozzle.

3. A method according to claim 1, including the step of using oil as the fuel.

4. A method according to claim 1, including the step of using at least one of natural gas and propane as the fuel.

* * * * *